(12) United States Patent
Gomita

(10) Patent No.: US 11,257,248 B2
(45) Date of Patent: Feb. 22, 2022

(54) INFORMATION PROCESSING DEVICE, INFORMATION PROCESSING METHOD, RECORDING MEDIUM, AND IMAGE CAPTURING APPARATUS FOR SELF-POSITION-POSTURE ESTIMATION

(71) Applicant: SONY CORPORATION, Tokyo (JP)

(72) Inventor: Jun Gomita, Tokyo (JP)

(73) Assignee: SONY CORPORATION, Tokyo (JP)

( * ) Notice: Subject to any disclaimer, the term of this patent is extended or adjusted under 35 U.S.C. 154(b) by 82 days.

(21) Appl. No.: 16/633,235

(22) PCT Filed: May 22, 2018

(86) PCT No.: PCT/JP2018/019567
§ 371 (c)(1),
(2) Date: Jan. 23, 2020

(87) PCT Pub. No.: WO2019/026390
PCT Pub. Date: Feb. 7, 2019

(65) Prior Publication Data
US 2020/0160557 A1 May 21, 2020

(30) Foreign Application Priority Data

Aug. 1, 2017 (JP) .............................. JP2017-149321

(51) Int. Cl.
*G06T 7/292* (2017.01)
*G06T 7/73* (2017.01)
*G06T 7/246* (2017.01)

(52) U.S. Cl.
CPC ................ *G06T 7/74* (2017.01); *G06T 7/248* (2017.01); *G06T 7/292* (2017.01); *G06T 2207/30244* (2013.01)

(58) Field of Classification Search
None
See application file for complete search history.

(56) References Cited

U.S. PATENT DOCUMENTS

2005/0069195 A1 3/2005 Uezono et al.
2008/0069405 A1 3/2008 Endo et al.
(Continued)

FOREIGN PATENT DOCUMENTS

CN 103582802 A 2/2014
CN 106461391 A 2/2017
(Continued)

OTHER PUBLICATIONS

International Search Report and Written Opinion of PCT Application No. PCT/JP2018/019567, dated Jul. 24, 2018, 08 pages of ISRWO.

*Primary Examiner* — Idowu O Osifade
(74) *Attorney, Agent, or Firm* — Chip Law Group

(57) ABSTRACT

Provided is an information processing device that includes a movement estimation unit that estimates position and posture movement by using corresponding-point information obtained based on image capturing, and a corresponding-point information selection unit that selects the corresponding-point information to be used by the movement estimation unit from among a plurality of pieces of corresponding-point information. The plurality of pieces of corresponding-point information includes first corresponding-point information obtained based on image capturing by a first camera set including a first camera and a second camera, and second corresponding-point information obtained based on image capturing by a second camera set including a third camera and a fourth camera. The first camera set has a wider view angle than that of the second camera set. The first camera set and the second camera set have image capturing ranges that are at least partially identical to each other.

17 Claims, 8 Drawing Sheets

(56) References Cited

U.S. PATENT DOCUMENTS

| | | | |
|---|---|---|---|
| 2014/0043444 A1 | 2/2014 | Haraguchi et al. | |
| 2015/0071524 A1* | 3/2015 | Lee | G06K 9/4671 |
| | | | 382/154 |
| 2015/0077520 A1* | 3/2015 | Ohba | G06F 3/017 |
| | | | 348/47 |
| 2015/0262029 A1* | 9/2015 | Pirchheim | G06T 3/00 |
| | | | 382/103 |
| 2017/0067739 A1 | 3/2017 | Siercks et al. | |
| 2019/0033989 A1* | 1/2019 | Wang | G06F 3/0346 |
| 2019/0364206 A1* | 11/2019 | Dal Mutto | H04N 17/002 |
| 2020/0051267 A1* | 2/2020 | Knorr | G06T 7/579 |

FOREIGN PATENT DOCUMENTS

| | | |
|---|---|---|
| CN | 106908046 A | 6/2017 |
| DE | 102004047325 A1 | 4/2005 |
| EP | 1901029 A2 | 3/2008 |
| EP | 2717013 A1 | 4/2014 |
| EP | 3140613 A1 | 3/2017 |
| JP | 2005-106505 A | 4/2005 |
| JP | 2008-070267 A | 3/2008 |
| JP | 2012-247364 A | 12/2012 |
| JP | 2015-022510 A | 2/2015 |
| JP | 2016-045874 A | 4/2016 |
| WO | 2012/165491 A1 | 12/2012 |
| WO | 2015/169338 A1 | 11/2015 |
| WO | 2017/057054 A1 | 4/2017 |

* cited by examiner

INFORMATION PROCESSING DEVICE, INFORMATION PROCESSING METHOD, RECORDING MEDIUM, AND IMAGE CAPTURING APPARATUS FOR SELF-POSITION-POSTURE ESTIMATION

CROSS REFERENCE TO RELATED APPLICATIONS

This application is a U.S. National Phase of International Patent Application No. PCT/JP2018/019567 filed on May 22, 2018, which claims priority benefit of Japanese Patent Application No. JP 2017-149321 filed in the Japan Patent Office on Aug. 1, 2017. Each of the above-referenced applications is hereby incorporated herein by reference in its entirety.

FIELD

The present disclosure relates to an information processing device, an information processing method, a recording medium, and an image capturing apparatus.

BACKGROUND

There has been known a technology called a simultaneous localization and mapping (SLAM) method in which self-position-posture estimation of estimating the position and posture of a camera in real space based on a captured image obtained through image capturing by the camera and environment map production are simultaneously performed. Another existing technology performs the self-position-posture estimation by the SLAM method by using captured images obtained from a plurality of cameras (for example, Patent Literature 1 below).

CITATION LIST

Patent Literature

Patent Literature 1: JP2016-45874 A

SUMMARY

Technical Problem

When the self-position-posture estimation is performed by using captured images obtained from a plurality of cameras as described above, the accuracy of the self-position-posture estimation is affected by the range (image capturing range) of real space included in the captured images and the resolution (spatial resolution) of the captured images. The former image capturing range is wider as the view angles of the cameras are wider, which is advantageous for the self-position-posture estimation. When the number of pixels is equal between image sensors included in the cameras, the latter spatial resolution is higher as the view angles of the cameras are narrower, which is advantageous for the self-position-posture estimation. In other words, the image capturing range and the spatial resolution have the trade-off relation therebetween, and thus a sufficient accuracy of the self-position-posture estimation cannot be obtained in some cases.

Thus, the present disclosure discloses an information processing device, an information processing method, a recording medium, and an image capturing apparatus that are novel and modified and can further improve the accuracy of self-position-posture estimation.

Solution to Problem

According to the present disclosure, an information processing device is provided that includes: a movement estimation unit configured to estimate position and posture movement by using corresponding-point information obtained based on image capturing; and a corresponding-point information selection unit configured to select the corresponding-point information to be used by the movement estimation unit from among a plurality of pieces of corresponding-point information, wherein the pieces of corresponding-point information include first corresponding-point information obtained based on image capturing by a first camera set including a first camera and a second camera, and second corresponding-point information obtained based on image capturing by a second camera set including a third camera and a fourth camera, the first camera set has a wider view angle than that of the second camera set, and the first camera set and the second camera set have image capturing ranges that are at least partially identical to each other.

Moreover, according to the present disclosure, an information processing method is provided that includes: estimating position and posture movement by using corresponding-point information obtained based on image capturing; and selecting, by a processor, the corresponding-point information to be used to estimate the movement from among a plurality of pieces of corresponding-point information, wherein the pieces of corresponding-point information include first corresponding-point information obtained based on image capturing by a first camera set including a first camera and a second camera, and second corresponding-point information obtained based on image capturing by a second camera set including a third camera and a fourth camera, the first camera set has a wider view angle than that of the second camera set, and the first camera set and the second camera set have image capturing ranges that are at least partially identical to each other.

Moreover, according to the present disclosure, a computer-readable recording medium is provided that records a computer program configured to cause a computer to achieve: a function to estimate position and posture movement by using corresponding-point information obtained based on image capturing; and a function to select the corresponding-point information to be used to estimate the movement from among a plurality of pieces of corresponding-point information, wherein the pieces of corresponding-point information include first corresponding-point information obtained based on image capturing by a first camera set including a first camera and a second camera, and second corresponding-point information obtained based on image capturing by a second camera set including a third camera and a fourth camera, the first camera set has a wider view angle than that of the second camera set, and the first camera set and the second camera set have image capturing ranges that are at least partially identical to each other.

Moreover, according to the present disclosure, an image capturing apparatus is provided that includes: a first camera set including a first camera and a second camera; a second camera set including a third camera and a fourth camera; a movement estimation unit configured to estimate position and posture movement by using corresponding-point information obtained based on image capturing; and a corresponding-point information selection unit configured to select the corresponding-point information to be used by the movement estimation unit from among a plurality of pieces of corresponding-point information, wherein the pieces of corresponding-point information include first corresponding-point information obtained based on image capturing by a first camera set including a first camera and a second camera, and second corresponding-point information obtained based on image capturing by a second camera set including a third camera and a fourth camera, the first camera set has a wider view angle than that of the second camera set, and the first camera set and the second camera set have image capturing ranges that are at least partially identical to each other.

Advantageous Effects of Invention

According to the present disclosure as described above, the accuracy of self-position-posture estimation can be further improved.

The above-described effect is not necessarily restrictive, but any effect described in the present specification or any other effect understandable from the present specification may be achieved together with or in place of the above-described effect.

DESCRIPTION OF EMBODIMENTS

A preferable embodiment of the present disclosure will be described below in detail with reference to the accompanying drawings. In the present specification and drawings, components having functional configurations identical to each other in effect are denoted by an identical reference sign, and duplicate description thereof are omitted.

In the present specification and drawings, a plurality of components having functional configurations identical to each other in effect may be distinguished by different alphabets appended to an identical reference sign. However, when not particularly needed to be distinguished from each other, a plurality of components having functional configurations identical to each other in effect are denoted by an identical reference sign only.

Description will be made in the following order.

<<1. Background
<<2. Configuration>>
<2-1. Device configuration>
<2-2. Configuration of processing unit>
<<3. Operation>>
<3-1. Overall process of processing>
<3-2. Process of three-dimensional position information acquisition processing>
<3-3. Process of position-posture information acquisition processing>
<<4. Modifications>>
<4-1. Modification 1>
<4-2. Modification 2>
<<5. Exemplary hardware configuration>>
<<6. Conclusion>>

1. Background

Description of an image capturing apparatus according to an embodiment of the present disclosure starts with description of the background of creation of the image capturing apparatus according to the embodiment of the present disclosure.

A self-position-posture estimation technology of estimating the position of a camera in real space based on a captured image obtained through image capturing by the camera has become widely applied to, for example, robots, automobiles, or portable terminals. A technology called a SLAM method of simultaneously performing self-position-posture estimation and environment map production is known as an example of such a self-position-posture estimation technology based on a captured image.

Another technology performs the self-position-posture estimation by the SLAM method using captured images obtained from a plurality of cameras. The SLAM method estimates the distance between a point in the captured images and the camera, and estimates the position and posture of the camera based on information of the estimated distance. When the captured images obtained from the cameras are used in the SLAM method, the distance estimation can be highly accurately performed as compared to a case in which the distance estimation is performed based on a captured image obtained from one camera, and as a result, the accuracy of the self-position-posture estimation is improved.

Figure 1:
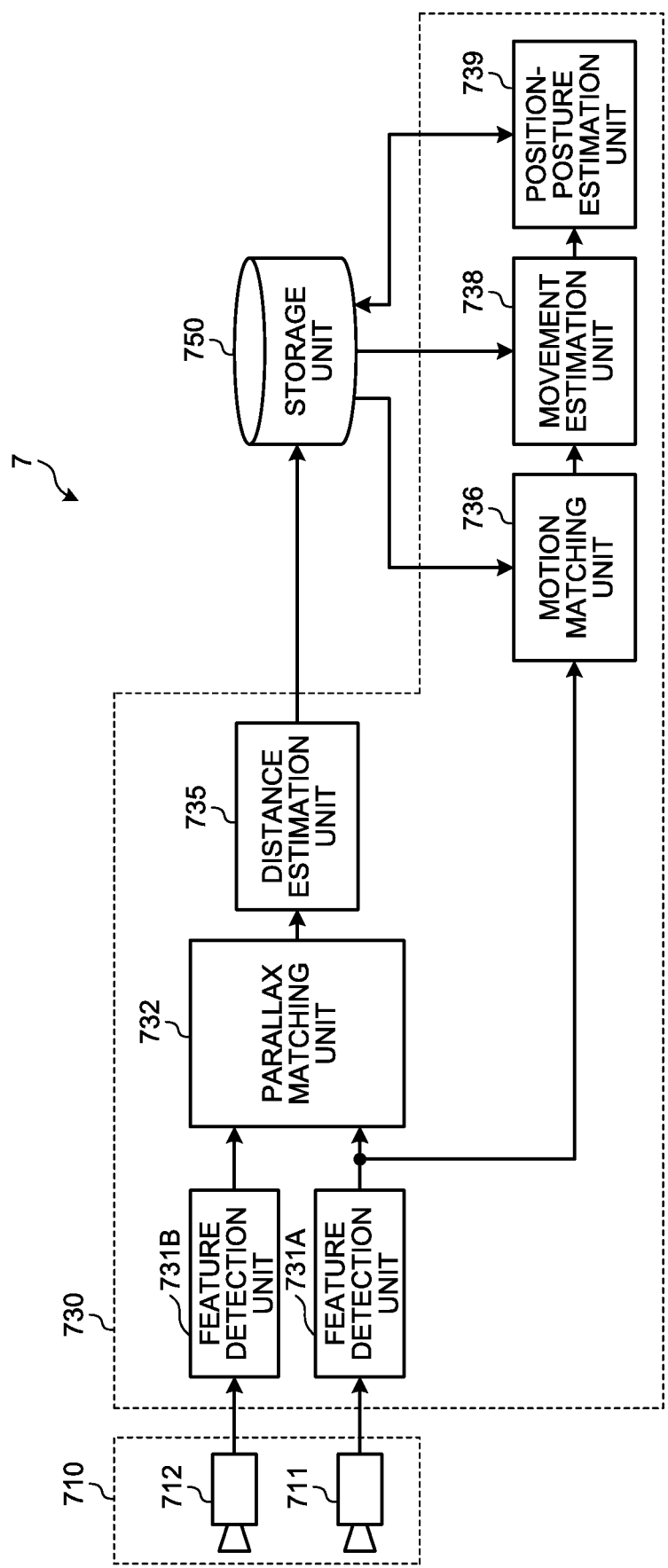
FIG. 1 is a block diagram illustrating an exemplary configuration according to a comparative example of an embodiment of the present disclosure.

FIG. 1 is a block diagram illustrating an exemplary configuration of an image capturing apparatus including two cameras and configured to perform the self-position-posture estimation by the SLAM method. In the following, this image capturing apparatus 7 illustrated in FIG. 1 is described as a comparative example of the embodiment of the present disclosure.

As illustrated in FIG. 1, the image capturing apparatus 7 according to the comparative example of the present embodiment includes a camera set 710 including a camera 711 and a camera 712, a processing unit 730, and a storage unit 750. The image capturing apparatus 7 according to the comparative example is assumed to move in real space. A mechanism for moving the image capturing apparatus 7 is not particularly limited, but the image capturing apparatus 7 may be mounted on a mobile device (such as a robot or a vehicle), may be held by or mounted on a user, or may have a configuration (not illustrated) for moving.

The camera 711 and the camera 712 included in the camera set 710 each acquire a captured image through image capturing of real space by using an image sensor such as a charge coupled device (CCD) or a complementary metal oxide semiconductor (CMOS). The image capturing ranges of the camera 711 and the camera 712 are at least partially identical to each other.

The camera 711 and the camera 712 may be disposed side by side, for example, in the horizontal direction or in the vertical direction. In the following description, the camera 711 and the camera 712 are disposed side by side in the horizontal direction: the camera 711 is disposed to perform image capturing on the left side in the traveling direction of the image capturing apparatus 7; and the camera 712 is disposed to perform image capturing on the right side in the traveling direction of the image capturing apparatus 7. In addition, in the following description, the view angles, the focal lengths, and the amount of image capturing pixels of the camera 711 and the camera 712 are identical to each other. A captured image obtained through image capturing by the camera set 710 is input to the processing unit 730.

The processing unit 730 performs the self-position-posture estimation based on image capturing by the camera set 710 to acquire information of the self position and posture.

The processing unit 730 performs initial setting by using, as a reference, the timing at which the image capturing apparatus 7 is turned on or the timing at which the camera set 710 acquires a captured image for the first time. For example, at the initial setting, the processing unit 730 sets a three-dimensional coordinate system (real-space coordinate system) in real space, and initial position and posture indicating the self position and posture in the real-space coordinate system, and stores this information in the storage unit 750.

In addition, the processing unit 730 sequentially acquires information of the self position and posture by estimating movement of the self position and posture based on captured images input from the camera set 710 in a temporally sequential manner. Functions of the processing unit 730 are described below in more detail with reference to FIG. 1.

As illustrated in FIG. 1, the processing unit 730 according to the present comparative example has functions of a feature detection unit 731A, a feature detection unit 731B, a parallax matching unit 732, a distance estimation unit 735, a motion matching unit 736, a movement estimation unit 738, and a position-posture estimation unit 739.

The feature detection unit 731A and the feature detection unit 731B detect feature points from a left image based on image capturing by the camera 711 and a right image based on image capturing by the camera 712, respectively. The left image and the right image input to the feature detection unit 731A and the feature detection unit 731B may be captured images obtained through image capturing by the camera 711 and the camera 712 or may be images obtained by performing various kinds of image processing on the captured images. For example, the image processing performed on the captured images may include optical distortion correction processing, gain adjustment processing, and parallelization processing that compensates the posture difference between the cameras.

The feature detection unit 731A and the feature detection unit 731B have functions identical to each other in effect except that images different from each other are input thereto. Hereinafter, when not needed to be distinguished from each other, the feature detection unit 731A and the feature detection unit 731B are collectively referred to as a feature detection unit 731.

In addition, the feature detection unit 731 calculates a feature amount (feature vector) related to a detected feature point. The method by which the feature detection unit 731 detects a feature point and the method by which the feature detection unit 731 calculates a feature amount are not particularly limited, but may be various kinds of publicly known methods.

The parallax matching unit 732 performs matching (association) between feature points detected by the feature detection unit 731A and the feature detection unit 731B, and specifies a parallax as the difference between the position of each feature point on the left image and the position of the feature point on the right image. For example, the parallax matching unit 732 may perform the feature point matching by comparing the feature amount of a feature point detected from the left image by the feature detection unit 731A and the feature amount of a feature point detected from the right image by the feature detection unit 731B. Parallax information including the positions of each feature point in image coordinate systems of the left image and the right image is obtained by the feature point matching and input from the parallax matching unit 732 to the distance estimation unit 735.

The distance estimation unit 735 estimates the distance to each feature point by using the parallax information input from the parallax matching unit 732. For example, the distance estimation unit 735 may calculate the distance based on the parallax by the principle of triangulation. Specifically, when f represents the focal length of the camera 711 and the camera 712, B represents the distance (baseline length) between the camera 711 and the camera 712, and d represents the parallax, a distance D can be calculated by Expression (1) below.

$$D = f \cdot B / d \quad (1)$$

In addition, the distance estimation unit 735 calculates, based on the distance D, three-dimensional position information indicating the position of each feature point in the real-space coordinate system. The real-space coordinate system is a three-dimensional coordinate system corresponding to real space, and may be a coordinate system set at the above-described initial setting or may be a coordinate system independently set each time a captured image is input. The calculated three-dimensional position information is input from the distance estimation unit 735 to the storage unit 750 and stored in the storage unit 750 in association with the feature amount calculated by the feature detection unit 731.

The motion matching unit 736 acquires, from the storage unit 750, the three-dimensional position information and the feature amount of each feature point detected in the previous frame (past frame). In addition, the motion matching unit 736 generates corresponding-point information through matching (association) between the feature point detected from the left image of the current frame by the feature detection unit 731A and the feature point detected in the previous frame. The matching may be performed by, for example, comparing the feature amounts of the feature points.

The corresponding-point information generated by the motion matching unit 736 may include, in association, the three-dimensional position information of each feature point in the previous frame and two-dimensional position information indicating the position of the feature point in the image coordinate system of the left image of the current frame.

The movement estimation unit 738 estimates movement (change) of the position and posture of the image capturing apparatus 7 (more accurately, the camera 711) by using the corresponding-point information generated by the motion matching unit 736.

For example, the movement estimation unit 738 estimates position and posture movement between frames based on the three-dimensional position information of each feature point in the previous frame, which is included in the corresponding-point information, and the two-dimensional position information indicating the position of the feature point in the image coordinate system of the left image of the current frame. The estimation of position and posture movement between frames by the movement estimation unit 738 may be performed by solving a minimization problem with an error on an image as cost when each feature point is projected onto a two-dimensional plane.

The movement information obtained through the movement estimation by the movement estimation unit 738 and indicating position and posture movement is input to the position-posture estimation unit 739.

The position-posture estimation unit 739 estimates the self position and posture based on the movement information input from the movement estimation unit 738. For example, the position-posture estimation unit 739 may acquire position-posture information indicating the self position and posture corresponding to the current frame based on the initial position and posture information or the position-posture information corresponding to the previous frame stored in the storage unit 750, and the position and posture movement between frames. The position-posture information acquired by the position-posture estimation unit 739 is stored in the storage unit 750.

The storage unit 750 stores computer programs and parameters for the above-described processing unit 730 to execute each function. For example, the storage unit 750 may store the three-dimensional position information of each feature point, which is acquired by the distance estimation unit 735, and the position-posture information acquired by the position-posture estimation unit 739.

The configuration of the image capturing apparatus 7 according to the comparative example of the present embodiment is described above. As described above, the image capturing apparatus 7 can perform the self-position-posture estimation based on captured images obtained from two cameras.

In the image capturing apparatus 7 according to the comparative example as described above, the feature point detection range of the feature detection unit 731 is simply a whole image, and the parallax matching unit 732 and the motion matching unit 736 perform the matching based on a feature point detected by the feature detection unit 731. Thus, neither the detection nor the matching can be performed when no feature point exists in an image or when no identical feature point is included in the left image and the right image or in an image of the previous frame and the current left image, and as a result, the self-position-posture estimation by the position-posture estimation unit 739 fails. In addition, the self-position-posture estimation by the position-posture estimation unit 739 potentially fails or the accuracy thereof potentially decreases when the number of feature points in an image is small or when the number of feature points included in both of the left image and the right image or in both of an image of the previous frame and the current left image is small.

The processing at the distance estimation unit 735 and the movement estimation unit 738 is affected by the resolution (spatial resolution) of an image. Thus, when the spatial resolution is low, the self-position-posture estimation potentially fails or the accuracy thereof potentially decreases.

As understood from Expression (1) related to the distance estimation, the accuracy of the distance estimation depends on the focal length f and the baseline length B. As the focal length f is longer (in other words, the view angle is narrower) or as the baseline length B is longer, the accuracy of the distance estimation improves, and as a result, the accuracy of the self-position-posture estimation improves. However, as the baseline length B is longer, a blind area is likely to be potentially generated at a near place.

Based on the above-described characteristics, it is requested that the view angle of each camera is desirably wide and the baseline length is desirably short to acquire an image including a larger number of feature points when the self-position-posture estimation is performed based on captured images acquired through image capturing by a plurality of cameras. However, it is requested that the view angle of each camera is desirably narrow and the baseline length is desirably long to increase the spatial resolution and improve the accuracy of the distance estimation. Thus, the above-described opposing requests need to be met to improve the accuracy of the self-position-posture estimation.

Accordingly, the present embodiment is created with a focus on the above-described situation. An image capturing apparatus according to the present embodiment includes two pairs of camera sets having mutually different view angles and mutually different baseline lengths, thereby meeting both above-described requests to further improve the accuracy of the self-position-posture estimation. Configurations and operations achieving such an effect according to the embodiment of the present disclosure will be sequentially described in detail below.

2. Configuration

Figure 2:
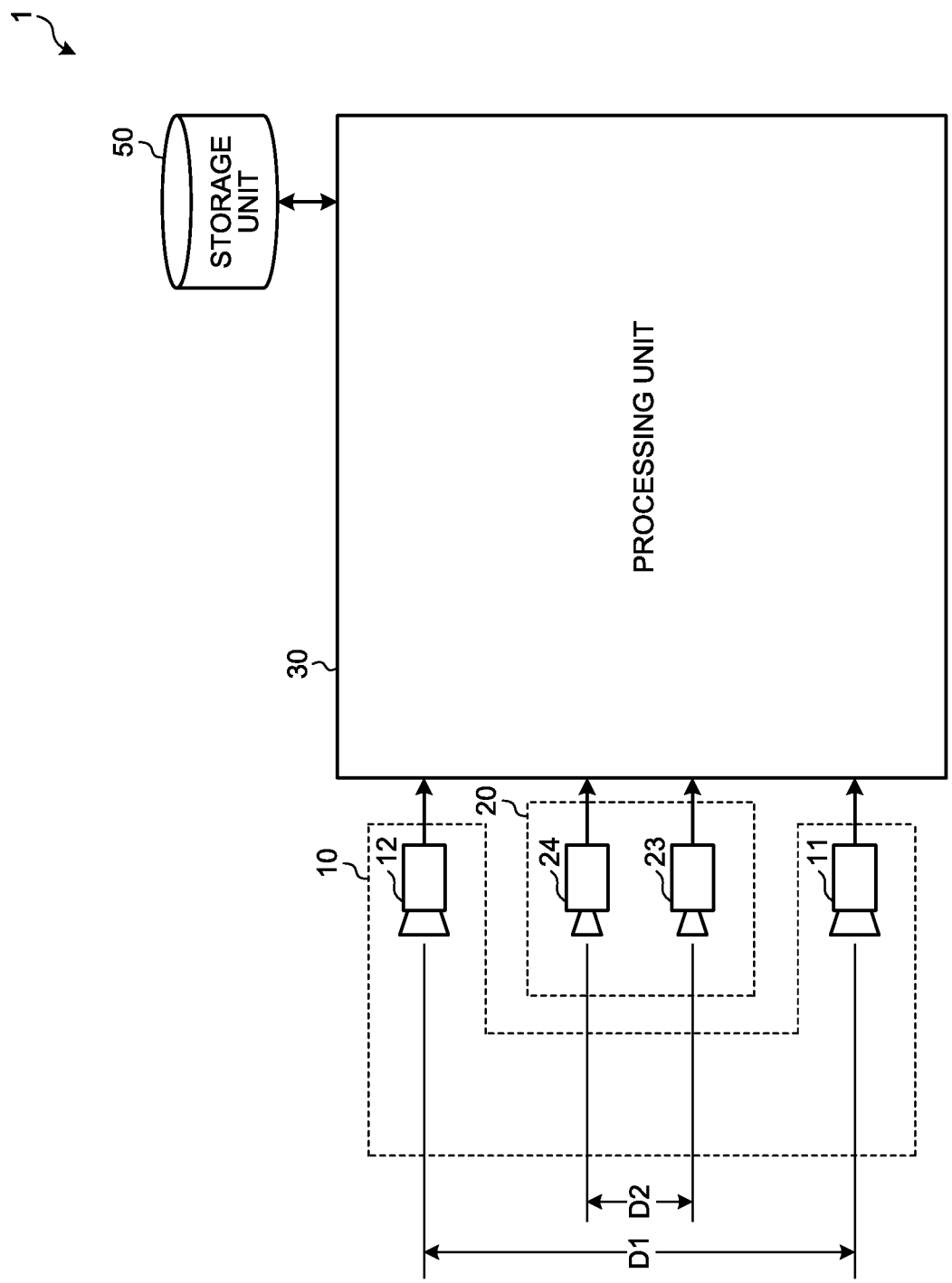
FIG. 2 is a block diagram illustrating a schematic configuration of an image capturing apparatus 1 according to the embodiment of the present disclosure.
Figure 3:
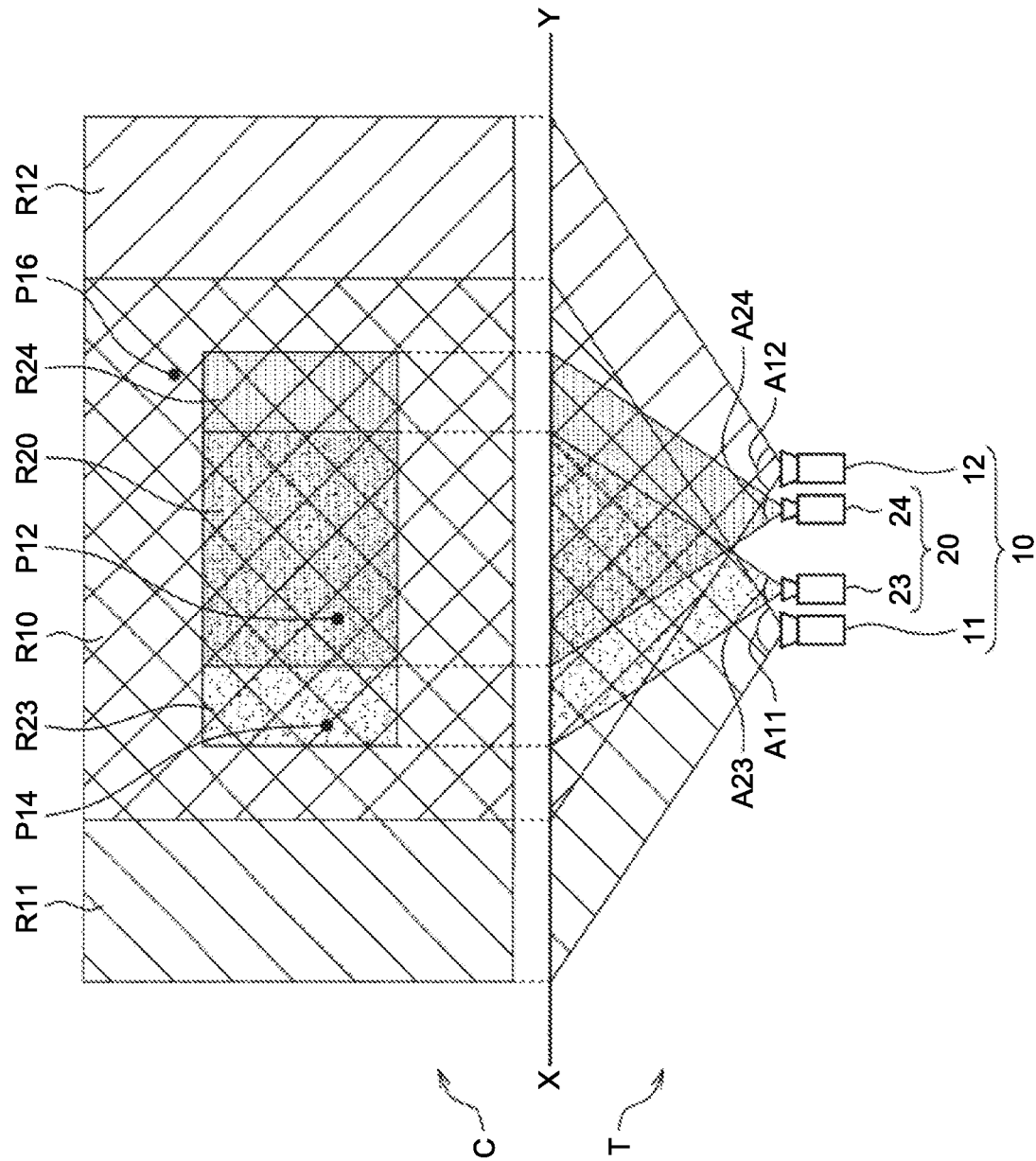
FIG. 3 is an explanatory diagram for describing advantages of a wide-angle camera set 10 and a narrow-angle camera set 20 according to the present embodiment.
Figure 4:
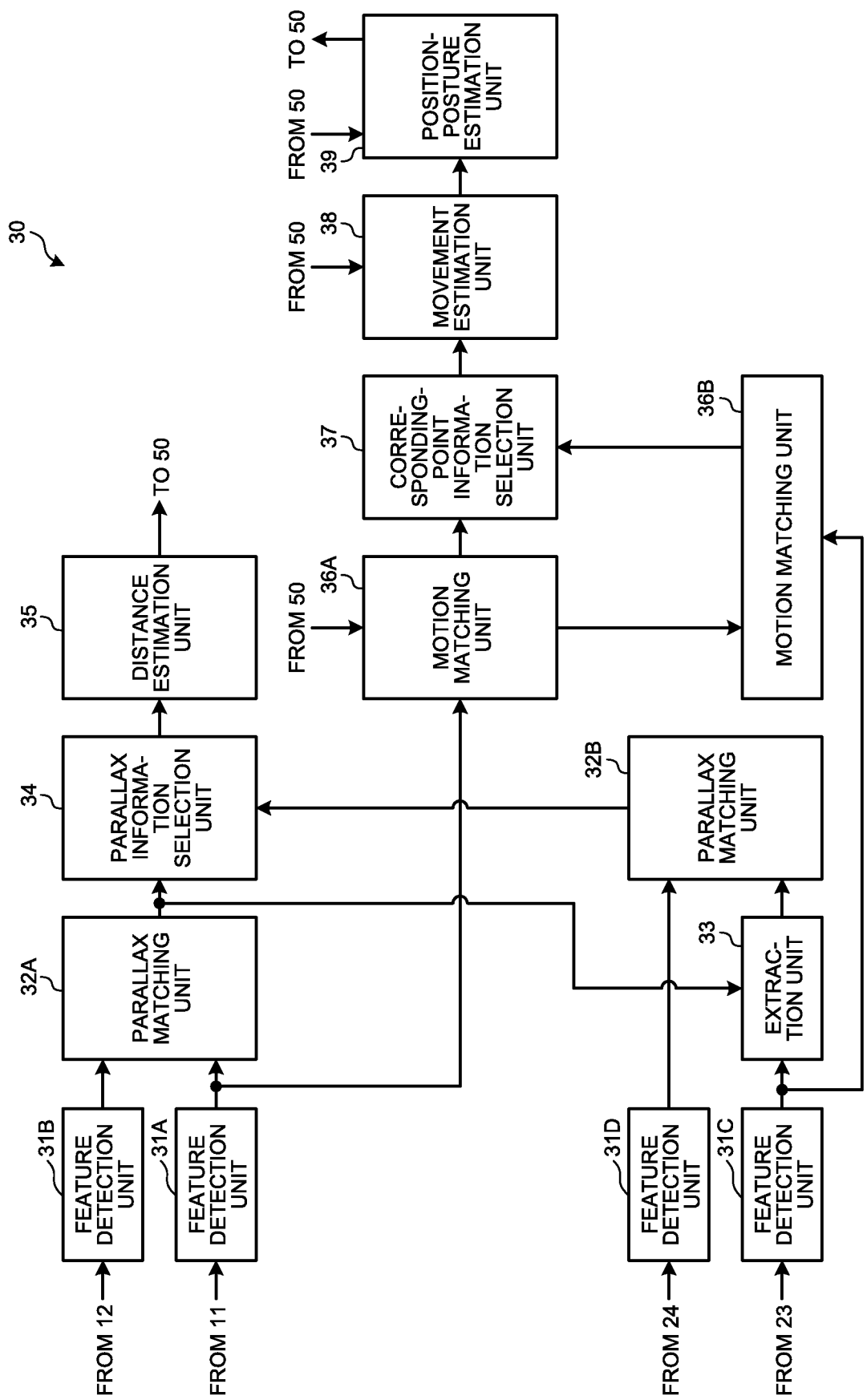
FIG. 4 is a block diagram illustrating a functional configuration of a processing unit 30 included in the image capturing apparatus 1 according to the present embodiment.

The following first describes the overall configuration of an image capturing apparatus 1 (exemplary information processing device) according to the present embodiment with reference to FIGS. 2 and 3, and then describes the configuration of a processing unit 30 included in the image capturing apparatus 1 with reference to FIG. 4.

<2-1. Schematic Configuration>

FIG. 2 is a block diagram illustrating a schematic configuration of the image capturing apparatus 1 according to the embodiment of the present disclosure. As illustrated in FIG. 2, the image capturing apparatus 1 according to the present embodiment includes a wide-angle camera set 10 (first camera set), a narrow-angle camera set 20 (second camera set), the processing unit 30, and a storage unit 50.

As illustrated in FIG. 2, the wide-angle camera set 10 includes a wide-angle camera 11 (first camera) and a wide-angle camera 12 (second camera). The narrow-angle camera set 20 includes a narrow-angle camera 23 (third camera) and a narrow-angle camera 24 (fourth camera). In the following description, the number of pixels of image sensors included in the wide-angle camera 11, the wide-angle camera 12, the narrow-angle camera 23, and the narrow-angle camera 24 are equal to one another, but the present embodiment is not limited to such an example.

The view angles of the wide-angle camera 11 and the wide-angle camera 12 included in the wide-angle camera set 10 (the view angle of the wide-angle camera set 10) are equal or substantially equal to each other. Similarly, the view angles of the narrow-angle camera 23 and the narrow-angle camera 24 included in the narrow-angle camera set 20 (the view angle of the narrow-angle camera set 20) are equal or substantially equal to each other. The view angle of the wide-angle camera 11 and the view angle of the wide-angle camera 12 are wider than the view angle of the narrow-angle camera 23 and the view angle of the narrow-angle camera 24 (in other words, the view angle of the narrow-angle camera 23 and the view angle of the narrow-angle camera 24 are narrower than the view angle of the wide-angle camera 11 and the view angle of the wide-angle camera 12). In addition, the image capturing ranges of the wide-angle camera set 10 (the wide-angle camera 11 and the wide-angle camera 12) and the narrow-angle camera set 20 (the narrow-angle camera 23 and the narrow-angle camera 24) are at least partially identical to each other.

In addition, as illustrated in FIG. 2, a baseline length D1 of the wide-angle camera set 10 as the distance between the wide-angle camera 11 and the wide-angle camera 12 is longer than a baseline length D2 of the narrow-angle camera set 20 as the distance between the narrow-angle camera 23 and the narrow-angle camera 24.

Captured images acquired through image capturing by the wide-angle camera set 10 and the narrow-angle camera set 20 are input to the processing unit 30.

The processing unit 30 performs the self-position-posture estimation based on the captured images input from the wide-angle camera set 10 and the narrow-angle camera set 20. Similarly to the processing unit 730 according to the comparative example described with reference to FIG. 1, the processing unit 30 according to the present embodiment performs the feature point distance estimation based on the parallax information acquired by performing the matching of a feature point detected from the images between the cameras. In addition, similarly to the processing unit 730 according to the comparative example described with reference to FIG. 1, the processing unit 30 according to the present embodiment sequentially acquires the position-posture information by estimating position and posture movement based on the corresponding-point information acquired through the feature point matching between frames. However, the processing unit 30 according to the present embodiment performs the feature point distance estimation based on parallax information selected from among the parallax information obtained based on image capturing by the wide-angle camera set 10 and the parallax information obtained based on image capturing by the narrow-angle camera set 20, which is a difference from the processing unit 730 according to the comparative example. In addition, the processing unit 30 according to the present embodiment performs the movement estimation based on corresponding-point information selected from among the corresponding-point information obtained based on image capturing by the wide-angle camera set 10 and the corresponding-point information obtained based on image capturing by the narrow-angle camera set 20, which is another difference from the processing unit 730 according to the comparative example. A detailed functional configuration of the processing unit 30 will be described later with reference to FIG. 4.

Similarly to the storage unit 750 according to the comparative example described with reference to FIG. 1, the storage unit 50 stores computer programs and parameters for the processing unit 30 to execute each function.

As described above, in the image capturing apparatus 1 according to the present embodiment, the parallax information and the corresponding-point information used for the distance estimation and the movement estimation, respectively can be selected from among those based on the wide-angle camera set 10 and those based on the narrow-angle camera set 20. When such selection is appropriately performed, the accuracy of the distance estimation and the accuracy of the movement estimation improve, and as a result, the accuracy of the self-position-posture estimation further improves.

The following first describes advantages of each of the wide-angle camera set 10 and the narrow-angle camera set 20 with reference to FIG. 3, and then describes criteria of selection of the parallax information and the corresponding-point information according to the present embodiment further improving the accuracy of the self-position-posture estimation. FIG. 3 is an explanatory diagram of for describing the advantages of each of the wide-angle camera set 10 and the narrow-angle camera set 20.

The following first describes exemplary disposition of the wide-angle camera set 10 and the narrow-angle camera set 20 with reference to Plan View T illustrated in the lower part of FIG. 3. In the example illustrated in Plan View T of FIG. 3, the wide-angle camera 11 and the wide-angle camera 12 included in the wide-angle camera set 10, and the narrow-angle camera 23 and the narrow-angle camera 24 included in the narrow-angle camera set 20 are horizontally disposed.

As described above, the baseline length of the wide-angle camera set 10 is longer than the baseline length of the narrow-angle camera set 20. With this configuration, the wide-angle camera set 10 is advantageous for improving the distance estimation accuracy at a distant place, and the narrow-angle camera set 20 can prevent generation of a blind area at a close place. As illustrated in Plan View T of FIG. 3, the narrow-angle camera 23 and the narrow-angle camera 24 may be disposed between the wide-angle camera 11 and the wide-angle camera 12.

Plan View T of FIG. 3 also illustrates the image capturing range of each camera when viewed from above. The upper part of FIG. 3 illustrates Projection Diagram C obtained by projecting the image capturing range of each camera onto Plane XY.

As described above, the view angle A11 of the wide-angle camera 11 and the view angle A12 of the wide-angle camera 12 are larger than the view angle A23 of the narrow-angle camera 23 and the view angle A24 of the narrow-angle camera 24. Accordingly, the wide-angle camera set 10 can perform image capturing of a wider range and thus is advantageous for, for example, an environment with less texture where a feature point is difficult to detect, and the narrow-angle camera set 20 has a high spatial resolution and thus contributes to improvement of the distance estimation accuracy.

Region R10 illustrated in Projection Diagram C of FIG. 3 is a range (hereinafter also referred to as the image capturing range of the wide-angle camera set 10) in which the wide-angle camera 11 and the wide-angle camera 12 included in the wide-angle camera set 10 can both perform image capturing. Region R11 illustrated in Projection Diagram C of FIG. 3 is a range in which only the wide-angle camera 11 can perform image capturing among the wide-angle camera 11 and the wide-angle camera 12 included in the wide-angle camera set 10. Similarly, Region R12 illustrated in Projection Diagram C of FIG. 3 is a range in which only the wide-angle camera 12 can perform image capturing among the wide-angle camera 11 and the wide-angle camera 12 included in the wide-angle camera set 10. Accordingly, a parallax based on image capturing by the wide-angle camera set 10 can be specified for a feature point included in Region R10, but the parallax based on image capturing by the wide-angle camera set 10 cannot be specified for a feature point included in Region R11 or Region R12. In other words, Region R11 and Region R12 are blind areas of the wide-angle camera set 10.

Region R20 illustrated in Projection Diagram C of FIG. 3 is a range (also referred to as the image capturing range of the narrow-angle camera set 20) in which the narrow-angle camera 23 and the narrow-angle camera 24 included in the narrow-angle camera set 20 can both perform image capturing. Region R23 illustrated in Projection Diagram C of FIG. 3 is a range in which only the narrow-angle camera 23 can perform image capturing among the narrow-angle camera 23 and the narrow-angle camera 24 included in the narrow-angle camera set 20. Similarly, Region R24 illustrated in Projection Diagram C of FIG. 3 is a range in which only the narrow-angle camera 24 can perform image capturing among the narrow-angle camera 23 and the narrow-angle camera 24 included in the narrow-angle camera set 20. Accordingly, a parallax based on image capturing by the narrow-angle camera set 20 can be specified for a feature point included in Region R20, but the parallax based on image capturing by the narrow-angle camera set 20 cannot be specified for a feature point included in Region R23 or Region R24. In other words, Region R23 and Region R24 are blind areas of the narrow-angle camera set 20.

Feature Point P12 illustrated in Projection Diagram C of FIG. 3 is included in both of Region R10 as the image capturing range of the wide-angle camera set 10 and Region R20 as the image capturing range of the narrow-angle camera set 20. Accordingly, the parallax based on image capturing by the wide-angle camera set 10 and the parallax based on image capturing by the narrow-angle camera set 20 can be both specified for Feature Point P12. However, the spatial resolution of the narrow-angle camera set 20 is high as described above. In such a case, the parallax information based on image capturing by the narrow-angle camera set 20 can be selected and used for the distance estimation to improve the accuracy of the distance estimation of Feature Point P12.

Feature Point P14 and Feature Point P16 illustrated in Projection Diagram C of FIG. 3 are included in Region R10 as the image capturing range of the wide-angle camera set 10 but are not included in Region R20 as the image capturing range of the narrow-angle camera set 20. Accordingly, for Feature Point P14 and Feature Point P16, the parallax based on image capturing by the wide-angle camera set 10 can be specified but the parallax based on image capturing by the narrow-angle camera set 20 cannot be specified. In such a case, the parallax information based on image capturing by the wide-angle camera set 10 can be selected and used for the distance estimation to estimate the distance of each feature point when the parallax based on image capturing by the narrow-angle camera set 20 cannot be specified.

The criteria of selection of the parallax information used for the distance estimation in the present embodiment are described above. The following describes criteria of selection of the corresponding-point information used for the movement estimation in the present embodiment.

The corresponding-point information can be obtained by the matching between frames and thus is not obtained when a feature point is included in an image of the current frame but not in an image of the previous frame. For example, when a feature point is included in the image of the current frame, the corresponding-point information may be obtained or may not be obtained, depending on self position and posture movement between frames. In addition, as described above, the parallax is specified only for a feature point included in the image capturing ranges of both cameras included in each camera set. However, the corresponding-point information can be obtained in some cases when a feature point is not included in the image capturing ranges of both cameras included in the camera set but is included in the image capturing range of one camera used for the matching between frames. With reference to the above-described points, the following describes the criteria of selection of the corresponding-point information used for the movement estimation.

The following description is made with an example in which a feature point based on image capturing by the wide-angle camera 11 in the wide-angle camera set 10 is used for the matching between frames, and a feature point based on image capturing by the narrow-angle camera 23 in the narrow-angle camera set 20 is used for the matching between frames.

As described above, Feature Point P12 is included in both of Region R10 as the image capturing range of the wide-angle camera set 10 and Region R20 as the image capturing range of the narrow-angle camera set 20. Feature Point P14 is not included in Region R20 as the image capturing range of the narrow-angle camera set 20 but is included in both of Region R10 as the image capturing range of the wide-angle camera set 10 and Region R23 as the image capturing range of the narrow-angle camera 23. Accordingly, the corresponding-point information based on image capturing by the wide-angle camera set 10 and the corresponding-point information based on image capturing by the narrow-angle camera set 20 can be both obtained for Feature Point P12 and Feature Point P14 in some cases. As described above, the spatial resolution of the narrow-angle camera set 20 is high. In such a case, the corresponding-point information based on image capturing by the narrow-angle camera set 20 can be selected and used for the movement estimation to improve the accuracy of the movement estimation.

However, as described above, depending on the self position and posture movement between frames, the corresponding-point information based on image capturing by the narrow-angle camera set 20 is not obtained but only the corresponding-point information based on image capturing by the wide-angle camera set 10 is obtained for Feature Point P12 and Feature Point P14 in some cases. In such a case, the corresponding-point information based on image capturing by the wide-angle camera set 10 is desirably selected and used for the movement estimation. With this configuration, when the corresponding-point information based on image capturing by the narrow-angle camera set 20 is not obtained, an increased number of corresponding points can be used for the movement estimation to improve the accuracy of the movement estimation.

As described above, Feature Point P16 is included in Region R10 as the image capturing range of the wide-angle camera set 10 but not in Region R20 as the image capturing range of the narrow-angle camera set 20. In addition, Feature Point P16 is included in none of Region R23 as the image capturing range of the narrow-angle camera 23 and Region R24 as the image capturing range of the narrow-angle camera 24. Accordingly, the corresponding-point information based on image capturing by the wide-angle camera set 10 can be obtained for Feature Point P16, and the corresponding-point information based on image capturing by the narrow-angle camera set 20 cannot be obtained for Feature Point P16 in some cases. In such a case, the corresponding-point information based on image capturing by the wide-angle camera set 10 is desirably selected and used for the movement estimation. With this configuration, when the corresponding-point information based on image capturing by the narrow-angle camera set 20 is not obtained, an increased number of corresponding points can be used for the movement estimation to improve the accuracy of the movement estimation.

The advantages of each camera set and the criteria of selection of the parallax information and the corresponding-point information according to the present embodiment are described above with reference to FIG. 3. However, the configuration illustrated in FIG. 3 is merely an example, and the present embodiment is not limited to the example. The wide-angle camera 11, the wide-angle camera 12, the narrow-angle camera 23, and the narrow-angle camera 24 may be disposed in various manners. For example, Projection Diagram C of FIG. 3 illustrates an example in which the image capturing range of the narrow-angle camera set 20 is completely included in the image capturing range of the wide-angle camera set 10, but the present embodiment is not limited to the example. A partial region of the image capturing range of the narrow-angle camera set 20 may be out of the image capturing range of the wide-angle camera set 10. In addition, Projection Diagram C of FIG. 3 indicates an example in which the image capturing range of the narrow-angle camera set 20 is positioned at a central part of the image capturing range of the wide-angle camera set 10, but the present technology is not limited to the example. The image capturing range of the narrow-angle camera set 20 may be positioned at a lower part in the image capturing range of the wide-angle camera set 10. For example, feature points are more likely to exist on the ground than in the sky when image capturing is performed outdoors, and thus, with such a configuration, it is expected to obtain an effect that a large number of feature points are included in the image capturing range of the narrow-angle camera set 20.

<2-2. Configuration of Processing Unit>

The overall configuration of the image capturing apparatus 1 according to the present embodiment is described above. Subsequently, the functional configuration of the processing unit 30 included in the image capturing apparatus 1 will be described in detail. Similarly to the processing unit 730 described with reference to FIG. 1, the processing unit 30 performs the self-position-posture estimation to acquire the position-posture information indicating the self position and posture. However, for example, the processing unit 30 according to the present embodiment selects, in accordance with the above-described selection criteria, the parallax information to be used for the distance estimation and the corresponding-point information to be used for the self-position-posture estimation, which is a difference from the processing unit 730 according to the comparative example. In the following, description of any part of the functional configuration of the processing unit 30 according to the present embodiment, which is the same as that of the functional configuration of the processing unit 730 according to the comparative example described with reference to FIG. 1 will be omitted as appropriate, and any different part therebetween will be mainly described.

FIG. 4 is a block diagram illustrating a functional configuration of the processing unit 30 included in the image capturing apparatus 1 according to the present embodiment. As illustrated in FIG. 4, the processing unit 30 according to the present embodiment has functions of feature detection units 31A to 31D, parallax matching units 32A and 32B, an extraction unit 33, a parallax information selection unit 34, a distance estimation unit 35, a motion matching unit 36A, a motion matching unit 36B, a corresponding-point information selection unit 37, a movement estimation unit 38, and a position-posture estimation unit 39.

The feature detection units 31A to 31D each detect a feature point from an image. The functions of the feature detection units 31A to 31D are the same as the function of the feature detection unit 731 described with reference to FIG. 1 except for difference between in the image input source and the feature point output destination, and thus detailed description of processing is omitted. The feature detection units 31A to 31D have functions identical to each other in effect except for difference between in the image input source and the feature point output destination. Thus, the feature detection units 31A to 31D are collectively referred to as a feature detection unit 31 when not needed to be distinguished in the following description.

The feature detection unit 31A detects a feature point from the wide-angle left image based on image capturing by the wide-angle camera 11, and the feature detection unit 31B detects a feature point from the wide-angle right image based on image capturing by the wide-angle camera 12. The feature detection unit 31C detects a feature point from the narrow-angle left image based on image capturing by the narrow-angle camera 23, and the feature detection unit 31D detects a feature point from the narrow-angle right image based on image capturing by the narrow-angle camera 24.

The wide-angle left image, the wide-angle right image, the narrow-angle left image, and the narrow-angle right image input to the feature detection units 31A to 31D may be captured images obtained through image capturing by the wide-angle camera 11, the wide-angle camera 12, the narrow-angle camera 23, and the narrow-angle camera 24, or may be images obtained by performing various kinds of image processing on the captured images. For example, the image processing performed on the captured images may include optical distortion correction processing, gain adjustment processing, and parallelization processing that compensates the posture difference between the cameras.

The parallax matching unit 32A and the parallax matching unit 32B performs the feature point matching (association), specifies a parallax for each feature point, and obtains the parallax information. The functions of the parallax matching unit 32A and the parallax matching unit 32B are the same as the function of the parallax matching unit 732 described with reference to FIG. 1 except for difference in the feature point input source and the parallax information output destination. The parallax matching unit 32A and the parallax matching unit 32B have functions identical to each other in effect except for difference in the feature point input source and the parallax information output destination. Thus, the parallax matching unit 32A and the parallax matching unit 32B are collectively referred to as a parallax matching unit 32 when not needed to be distinguished in the following description.

As illustrated in FIG. 4, the feature point detected from the wide-angle left image by the feature detection unit 31A and the feature point detected from the wide-angle right image by the feature detection unit 31B are input to the parallax matching unit 32A. Then, the parallax matching unit 32A performs matching based on the feature amounts of the input feature points, and specifies the parallax between the matched feature points. Thus, the parallax specified by the parallax matching unit 32A is the parallax based on image capturing by the wide-angle camera set 10 described above, and information of the parallax specified by the parallax matching unit 32A is the parallax information based on image capturing by the wide-angle camera set 10. The parallax information based on image capturing by the wide-angle camera set 10, which is obtained by the parallax matching unit 32A is input to the extraction unit 33 and the parallax information selection unit 34.

The parallax matching unit 32B performs matching between the feature point detected from the narrow-angle left image by the feature detection unit 31C and the feature point detected from the narrow-angle right image by the feature detection unit 31D, and specifies the parallax between the matched feature points. Thus, the parallax specified by the parallax matching unit 32B is the parallax based on image capturing by the narrow-angle camera set 20 described above, and information of the parallax specified by the parallax matching unit 32B is the parallax information based on image capturing by the narrow-angle camera set 20. A feature point extracted by the extraction unit 33 from among the feature points detected from the narrow-angle left image by the feature detection unit 31C may be input to the parallax matching unit 32B.

The extraction unit 33 extracts, based on the parallax information based on image capturing by the wide-angle camera set 10, a feature point for which the parallax information based on image capturing by the wide-angle camera set 10 is obtained (in other words, a parallax is specified by the parallax matching unit 32A) among the feature points detected from the narrow-angle left image by the feature detection unit 31C. For example, the extraction unit 33 may perform the extraction through matching based on comparison between the feature amount of the feature point detected from the narrow-angle left image by the feature detection unit 31C and the feature amount of the feature point for which the parallax information based on image capturing by the wide-angle camera set 10 is obtained.

The parallax matching unit 32B may perform matching between the feature point extracted by the extraction unit 33 from among the feature points detected from the narrow-angle left image by the feature detection unit 31C and the feature point detected from the narrow-angle right image by the feature detection unit 31D. With this configuration, the parallax matching unit 32B can omit matching of a feature point for which a parallax cannot be specified by the parallax matching unit 32A, which leads to processing amount reduction.

The parallax information based on image capturing by the narrow-angle camera set 20, which is obtained by the parallax matching unit 32B is input to the parallax information selection unit 34.

The parallax information selection unit 34 selects, for each feature point, parallax information to be used by the distance estimation unit 35 (input to the distance estimation unit 35) from among the parallax information (first parallax information) based on image capturing by the wide-angle camera set 10 and the parallax information (second parallax information) based on image capturing by the narrow-angle camera set 20.

The parallax information selection unit 34 performs the parallax information selection in accordance with, for example, the selection criteria described with reference to FIG. 3. Specifically, the parallax information selection unit 34 may determine, for each feature point, whether the parallax information based on image capturing by the narrow-angle camera set 20 has been obtained, and may select, for each feature point, the parallax information to be used by the distance estimation unit 35 in accordance with whether the parallax information has been obtained.

For example, as for a feature point for which the parallax information based on image capturing by the narrow-angle camera set 20 is obtained, the parallax information selection unit 34 selects the parallax information of the feature point based on image capturing by the narrow-angle camera set 20, and inputs the parallax information to the distance estimation unit 35. With this configuration, the accuracy of distance estimation of the feature point by the distance estimation unit 35 can be improved since the spatial resolution of the narrow-angle camera set 20 is high.

In addition, as for a feature point for which the parallax information based on image capturing by the narrow-angle camera set 20 is not obtained but only the parallax information based on image capturing by the wide-angle camera set 10 is obtained, the parallax information selection unit 34 selects the parallax information of the feature point based on image capturing by the wide-angle camera set 10, and inputs the parallax information to the distance estimation unit 35. With this configuration, when the parallax based on image capturing by the narrow-angle camera set 20 cannot be specified, the distance of the feature point can be estimated.

As for a feature point for which the parallax information based on image capturing by the narrow-angle camera set 20 is selected, the parallax information selection unit 34 may convert positions in the image coordinate systems of the narrow-angle left image and the narrow-angle right image included in the parallax information into positions in the image coordinate systems of the wide-angle left image and the wide-angle right image, and then may input the positions to the distance estimation unit 35. With this configuration, the distance estimation unit 35 to be described later can handle, in a unified manner, the parallax information based on image capturing by the wide-angle camera set 10 and the parallax information based on image capturing by the narrow-angle camera set 20. In addition, through the conversion, the parallax information selection unit 34 can calculate, at the accuracy of subpixel or finer, positions in the image coordinate systems of the wide-angle left image and the wide-angle right image included in the parallax information based on image capturing by the narrow-angle camera set 20.

The distance estimation unit 35 estimates the distance to each feature point by using the parallax information input from the parallax information selection unit 34, and calculates the three-dimensional position information indicating the position of the feature point in the real-space coordinate system. The function of the distance estimation unit 35 is the same as the function of the distance estimation unit 735 described with reference to FIG. 1 except for difference in the parallax information input source, and thus detailed description thereof is omitted. The three-dimensional position information calculated by the distance estimation unit 35 is input from the distance estimation unit 35 to the storage unit 50 and stored in the storage unit 50 in association with the feature amount calculated by the feature detection unit 31.

The motion matching unit 36A and the motion matching unit 36B perform matching between a feature point detected in the previous frame (past frame) and a feature point detected in the current frame, and generate corresponding-point information. The functions of the motion matching unit 36A and the motion matching unit 36B are the same as the function of the motion matching unit 736 described with reference to FIG. 1 in effect except for difference in the feature point input source and the corresponding-point information output destination, and thus detailed description of processing thereof is omitted. The motion matching unit 36A and the motion matching unit 36B have functions identical to each other in effect except for difference in the feature point input source and the corresponding-point information output destination, and thus the motion matching unit 36A and the motion matching unit 36B are collectively referred to as a motion matching unit 36 when not needed to be distinguished in the following description.

The motion matching unit 36A acquires, from the storage unit 50, the three-dimensional position information and feature amount of each feature point detected in the previous frame. In addition, the motion matching unit 36A performs matching between a feature point detected from the wide-angle left image of the current frame by the feature detection unit 31A and a feature point detected in the previous frame, and generates corresponding-point information. Thus, the corresponding-point information generated by the motion matching unit 36A is the corresponding-point information based on image capturing by the wide-angle camera set 10 described above.

The corresponding-point information based on image capturing by the wide-angle camera set 10, which is generated by the motion matching unit 36A is input to the motion matching unit 36B and the corresponding-point information selection unit 37.

The motion matching unit 36B performs matching between a feature point detected from the wide-angle left image of the current frame by the feature detection unit 31C and a feature point detected in the previous frame, and generates corresponding-point information. Thus, the corresponding-point information generated by the motion matching unit 36B is the corresponding-point information based on image capturing by the narrow-angle camera set 20 described above.

As illustrated in FIG. 4, the motion matching unit 36B may perform the matching by using a feature point for which a corresponding point is found by the motion matching unit 36A among feature points detected in the previous frame. For example, when the image capturing range of the narrow-angle camera set 20 is completely included in the image capturing range of the wide-angle camera set 10 as described with reference to FIG. 3, the processing amount can be reduced by performing matching by using a feature point for which matching is performed by the motion matching unit 36A. However, the present embodiment is not limited to such an example, but the motion matching unit 36B may perform matching by using a feature point detected in the previous frame and acquired from the storage unit 50 instead of using a feature point for which matching is performed by the motion matching unit 36A. When part of the image capturing range of the narrow-angle camera set 20 is not included in the image capturing range of the wide-angle camera set 10, a larger amount of the corresponding-point information can be generated by performing matching by using a feature point acquired from the storage unit 50.

The corresponding-point information based on image capturing by the narrow-angle camera set 20, which is generated by the motion matching unit 36B is input to the corresponding-point information selection unit 37.

The corresponding-point information selection unit 37 selects, for each feature point, the corresponding-point information to be used by the movement estimation unit 38 (input to the movement estimation unit 38) from among the corresponding-point information (first corresponding-point information) based on image capturing by the wide-angle camera set 10 and the corresponding-point information (second corresponding-point information) based on image capturing by the narrow-angle camera set 20.

The corresponding-point information selection unit 37 performs the corresponding-point information selection in accordance with, for example, the selection criteria described with reference to FIG. 3. Specifically, the corresponding-point information selection unit 37 may determine, for each feature point, whether the corresponding-point information based on image capturing by the narrow-angle camera set 20 has been obtained, and may select, for each feature point, the corresponding-point information to be used by the movement estimation unit 38 in accordance with whether the corresponding-point information has been obtained.

For example, when the corresponding-point information based on image capturing by the narrow-angle camera set 20 has been obtained, the corresponding-point information selection unit 37 selects the corresponding-point information of the feature point based on image capturing by the narrow-angle camera set 20, and inputs the corresponding-point information to the movement estimation unit 38. With this configuration, the accuracy of the movement estimation for the feature point by the movement estimation unit 38 can be improved since the spatial resolution of the narrow-angle camera set 20 is high.

In addition, as for a feature point for which the corresponding-point information based on image capturing by the narrow-angle camera set 20 is not obtained but only the corresponding-point information based on image capturing by the wide-angle camera set 10 is obtained, the corresponding-point information selection unit 37 selects the corresponding-point information of the feature point based on image capturing by the wide-angle camera set 10, and inputs the corresponding-point information to the movement estimation unit 38. With this configuration, when the corresponding-point information based on image capturing by the narrow-angle camera set 20 is not obtained, an increased number of corresponding points can be used for the movement estimation to improve the accuracy of the movement estimation.

As for a feature point for which the corresponding-point information based on image capturing by the narrow-angle camera set 20 is selected, the corresponding-point information selection unit 37 may convert a position in the image coordinate system of the narrow-angle left image included in the corresponding-point information into a position in the image coordinate system of the wide-angle left image, and then may input the position to the movement estimation unit 38. With this configuration, the movement estimation unit 38 to be described later can handle, in a unified manner, the corresponding-point information based on image capturing by the wide-angle camera set 10 and the corresponding-point information based on image capturing by the narrow-angle camera set 20. In addition, through the conversion, the corresponding-point information selection unit 37 can calculate, at the accuracy of subpixel or finer, a position in the image coordinate system of the wide-angle left image included in the corresponding-point information based on image capturing by the narrow-angle camera set 20.

The movement estimation unit 38 acquires the movement information by estimating movement (change) of the position and posture of the image capturing apparatus 1 (more accurately, the wide-angle camera 11) by using the corresponding-point information input from the corresponding-point information selection unit 37. The function of the movement estimation unit 38 is the same as the function of the movement estimation unit 738 described with reference to FIG. 1 except for difference in the corresponding-point information input source, and thus detailed description thereof is omitted. The movement information acquired by the movement estimation unit 38 is input to the position-posture estimation unit 39.

The position-posture estimation unit 39 acquires the position-posture information indicating the self position and posture by estimating the self position and posture based on the movement information input from the movement estimation unit 38. The function of the position-posture estimation unit 39 is the same as the function of the position-posture estimation unit 739 described with reference to FIG. 1, and thus detailed description thereof is omitted. The position-posture information acquired by the position-posture estimation unit 39 is stored in the storage unit 50.

The exemplary configuration according to the present embodiment is described above. The above-described configuration is merely an example, and the present embodiment is not limited to the example. For example, the above description is made with an example in which the image capturing apparatus 1 has the functions of the wide-angle camera set 10 and the narrow-angle camera set 20 related to image capturing and the functions of the processing unit 30 and the storage unit 50 related to information processing, but the present embodiment is not limited to the example. For example, an image capturing apparatus including the wide-angle camera set 10 and the narrow-angle camera set 20, and an information processing device having the functions of the processing unit 30 and the storage unit 50 may be achieved as separate devices.

3. Operation

The exemplary configuration of the image capturing apparatus 1 according to the embodiment of the present disclosure is described above. Subsequently, an exemplary operation of the image capturing apparatus 1 according to the embodiment of the present disclosure will be described below. The following first describes the overall process of processing performed by the image capturing apparatus 1 with reference to FIG. 5, and then describes the process of processing related to acquisition of the three-dimensional position information and acquisition of the position-posture information with reference to FIGS. 6 and 7.

<3-1. Overall Process of Processing>

Figure 5:
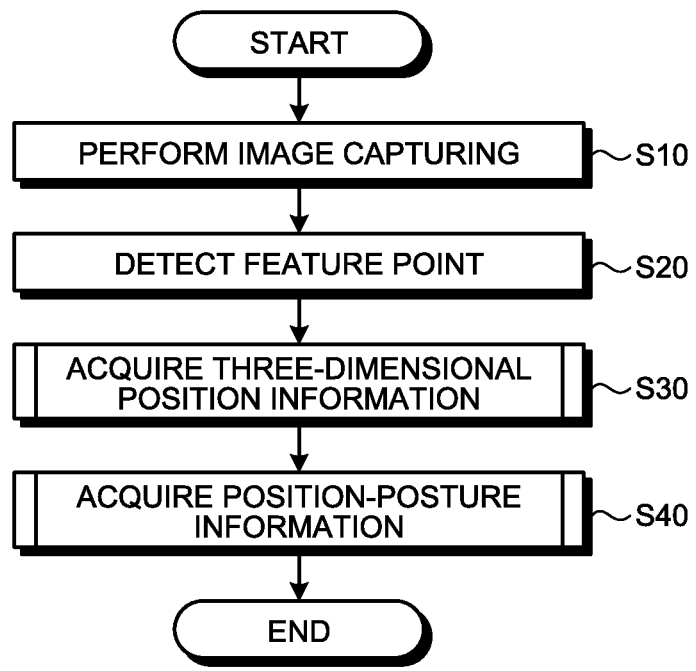
FIG. 5 is a flowchart illustrating the overall process of processing performed by the image capturing apparatus 1 according to the present embodiment.

FIG. 5 is a flowchart illustrating the overall process of processing performed by the image capturing apparatus 1 according to the present embodiment. As illustrated in FIG. 5, image capturing by the wide-angle camera 11, the wide-angle camera 12, the narrow-angle camera 23, and the narrow-angle camera 24 is first performed (S10).

Subsequently, the feature detection units 31A to 31D detect a feature point from an image based on image capturing by each camera, and calculate the feature amount of each feature point (S20).

Subsequently, the processing related to acquisition of the three-dimensional position information is performed (S30). The processing related to acquisition of the three-dimensional position information will be described later with reference to FIG. 6.

Subsequently, the processing related to acquisition of the position-posture information is performed (S40). The processing related to acquisition of the position-posture information will be described later with reference to FIG. 7.

The processing at steps S10 to S40 described above may be repeatedly performed.

<3-2. Process of Three-Dimensional Position Information Acquisition Processing>

Figure 6:
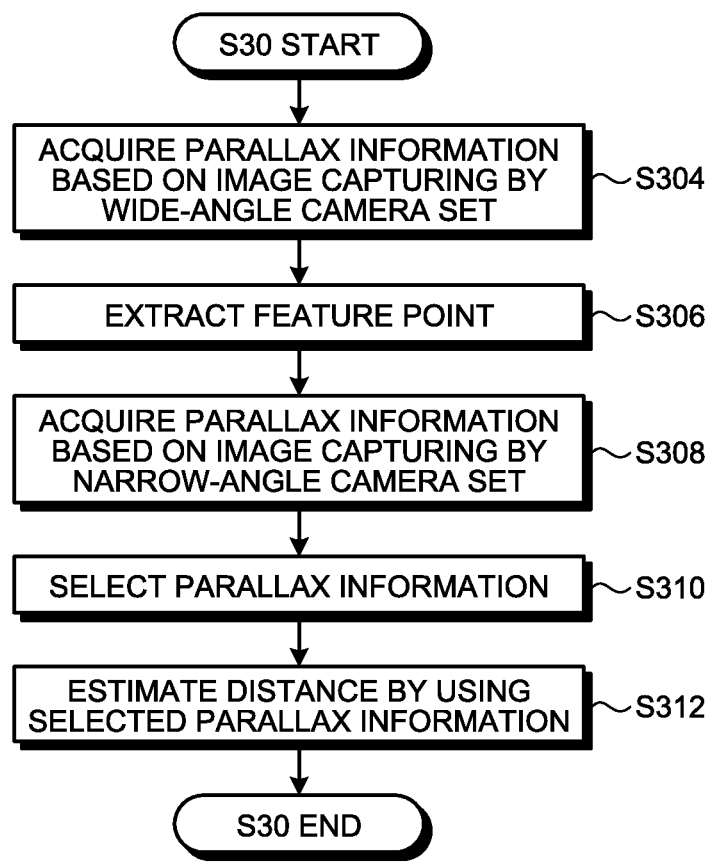
FIG. 6 is a flowchart illustrating the process of processing related to acquisition of three-dimensional position information.

FIG. 6 is a flowchart illustrating the process of the processing related to acquisition of the three-dimensional position information (S30). As illustrated in FIG. 6, the parallax matching unit 32A first acquires the parallax information based on image capturing by the wide-angle camera set 10 by performing matching between the feature points detected by the feature detection units 31A and 31B at step S20 (S304).

Subsequently, the extraction unit 33 extracts a feature point for which a parallax is specified at step S304 among feature points detected from the narrow-angle left image by the feature detection unit 31C (S306). Subsequently, the parallax matching unit 32B acquires the parallax information based on image capturing by the narrow-angle camera set 20 by performing matching between the feature point extracted at step S306 and the feature point detected by the feature detection unit 31D at step S20 (S308).

Subsequently, the parallax information selection unit 34 selects, for each feature point, parallax information to be used for the distance estimation from among the parallax information acquired at step S304 and the parallax information acquired at step S308 (S310).

Then, the distance estimation unit 35 acquires the three-dimensional position information of each feature point by performing the distance estimation by using the parallax information selected at step S312 (S312). The acquired three-dimensional position information of the feature point is stored in the storage unit 50.

<3-3. Process of Position-Posture Information Acquisition Processing>

Figure 7:
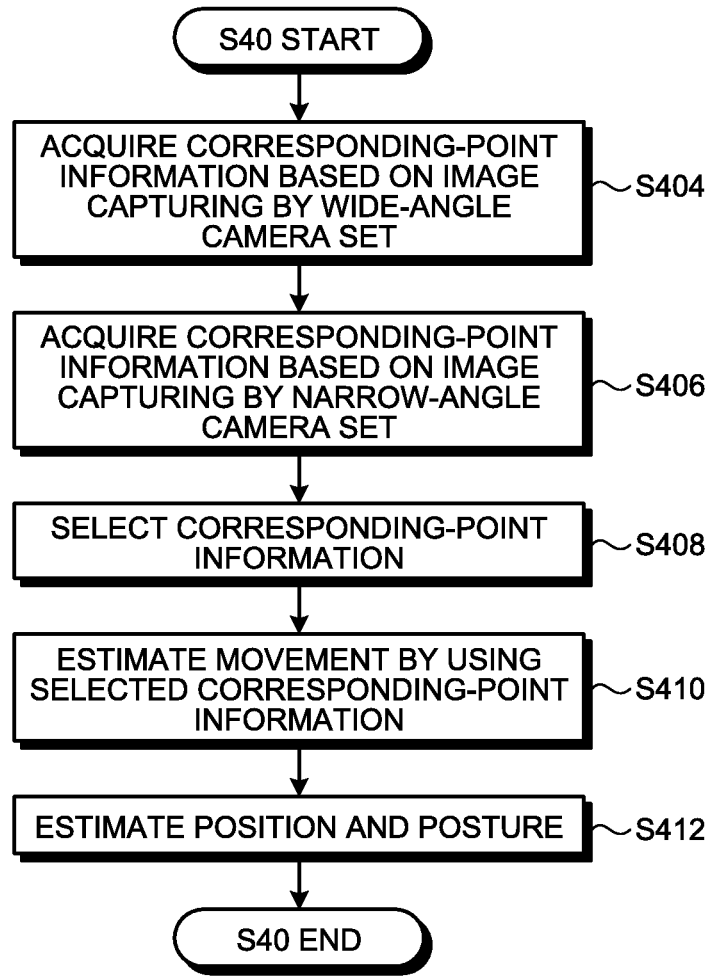
FIG. 7 is a flowchart illustrating the process of processing related to acquisition of position-posture information.

FIG. 7 is a flowchart illustrating the process of the processing related to acquisition of the position-posture information (S40). As illustrated in FIG. 7, the motion matching unit 36A first acquires the corresponding-point information based on image capturing by the wide-angle camera set 10 (S404). At step S404, the motion matching unit 36A may acquire the corresponding-point information by performing matching between the feature point detected by the feature detection unit 31A at step S20 and the feature point detected in the previous frame and stored in the storage unit 50.

Subsequently, the motion matching unit 36B acquires the corresponding-point information based on image capturing by the narrow-angle camera set 20 (S406). At step S406, the motion matching unit 36B may acquire the corresponding-point information by performing matching between the feature point detected by the feature detection unit 31C at step S20 and the feature point for which a corresponding point is found at step S404.

Subsequently, the corresponding-point information selection unit 37 selects corresponding-point information to be used for the movement estimation from among the corresponding-point information acquired at step S404 and the corresponding-point information acquired at step S406 (S408).

Subsequently, the movement estimation unit 38 acquires the movement information (S410) by estimating position and posture movement (change) by using the corresponding-point information selected at step S408. In addition, the position-posture estimation unit 39 acquires the position-posture information by performing position and posture estimation based on the movement information acquired at step S410.

The exemplary operation according to the present embodiment is described above. The above description is merely an example, and the present embodiment is not limited to the example. For example, FIG. 5 illustrates an example in which the processing at step S40 described with reference to FIG. 7 is performed after the processing at step S30 described with reference to FIG. 6, but the processing at step S30 and the processing at step S40 may be performed in parallel.

4. Modifications

The embodiment of the present disclosure is described above. The following describes modifications of the present embodiment. The modifications described below may be applied alone to the present embodiment or may be applied in combination to the present embodiment. Each modification may be applied in place of or in addition to the configuration described in the present embodiment.

<4-1. Modification 1>

The above-described embodiment describes an example in which the corresponding-point information to be used by the movement estimation unit 38 (input to the movement estimation unit 38) is selected for each feature point, but the present technology is not limited to the example.

When the corresponding-point information to be used by the movement estimation unit 38 is selected for each feature point, any corresponding-point information of all feature points for which the corresponding-point information based on image capturing by the wide-angle camera set 10 is obtained is input to the movement estimation unit 38 and used for the movement estimation. However, depending on a situation, the accuracy of the movement estimation is potentially improved by using only the corresponding-point information based on image capturing by the narrow-angle camera set 20 having a high spatial resolution but not using the corresponding-point information based on image capturing by the wide-angle camera set 10. For example, when the corresponding-point information based on image capturing by the narrow-angle camera set 20 has been obtained for a sufficient number of feature points, the accuracy of the movement estimation is likely to be improved by using only the corresponding-point information based on image capturing by the narrow-angle camera set 20 having a high spatial resolution.

Thus, the corresponding-point information selection unit 37 may select the corresponding-point information to be used by the movement estimation unit 38 in accordance with the number of feature points for which the corresponding-point information based on image capturing by the narrow-angle camera set 20 is obtained. The following description is made with such an example as Modification 1.

For example, when the corresponding-point information based on image capturing by the narrow-angle camera set 20 has been obtained for a sufficient (for example, equal to or larger than a predetermined threshold) number of feature points, the corresponding-point information selection unit 37 may input only the corresponding-point information based on image capturing by the narrow-angle camera set 20 to the movement estimation unit 38.

With this configuration, the accuracy of the movement estimation is potentially improved, and the processing amount of the movement estimation unit 38 is reduced.

<4-2. Modification 2>

When the corresponding-point information based on image capturing by the narrow-angle camera set 20 is continuously obtained for a sufficient number of feature points, it is useful to perform the self-position-posture estimation processing with input of only images based on image capturing by the narrow-angle camera 23 and the narrow-angle camera 24. In such a case, for example, the processing unit 30 may function in the same manner as the processing unit 730 according to the comparative example described with reference to FIG. 1 except for the input of images based on image capturing by the narrow-angle camera 23 and the narrow-angle camera 24.

However, the corresponding-point information based on image capturing by the wide-angle camera set 10 is desirably used when the corresponding-point information based on image capturing by the narrow-angle camera set 20 is not obtained any more for a sufficient number of feature points. Thus, the processing unit 30 may perform switching between processing (first processing) with input of only images based on image capturing by the narrow-angle camera 23 and the narrow-angle camera 24 and processing (second processing) with input of images based on image capturing by the wide-angle camera 11, the wide-angle camera 12, the narrow-angle camera 23, and the narrow-angle camera 24. The following description is made with such an example as Modification 2.

In such a case, the processing unit 30 may perform the switching based on the number of feature points for which the corresponding-point information based on image capturing by the narrow-angle camera set 20 is obtained or the movement information. For example, the processing unit 30 may perform the first processing when it is determined that the number of pieces of the corresponding-point information based on image capturing by the narrow-angle camera set 20 is equal to or larger than a predetermined threshold, and may perform the second processing when it is determined that the number of pieces of the corresponding-point information based on image capturing by the narrow-angle camera set 20 is smaller than the predetermined threshold. Alternatively, the processing unit 30 may perform the first processing when it is determined that the moving speed of the image capturing apparatus 1 is slower than a predetermined threshold based on the movement information, and may perform the second processing when it is determined that the moving speed of the image capturing apparatus 1 is faster than the predetermined threshold.

To perform the movement estimation by using the corresponding-point information based on image capturing by the wide-angle camera set 10, the three-dimensional position information of a feature point based on image capturing by the wide-angle camera set 10 is desirably stored at least one frame before. Accordingly, the threshold of the above-described determination is desirably set so that the above-described switching is performed before the corresponding-point information based on image capturing by the narrow-angle camera set 20 will not be obtained for a sufficient number of feature points.

With this configuration, the accuracy of the movement estimation is potentially improved, and the processing amount of the processing unit 30 is reduced.

When performing the switching as described above, the processing unit 30 may control electrical power supply to the wide-angle camera set 10 in accordance with the above-described switching. Specifically, the processing unit 30 may control electrical power supply to the wide-angle camera set 10 based on the number of feature points for which the corresponding-point information based on image capturing by the narrow-angle camera set 20 is obtained or based on the movement information.

For example, the processing unit 30 may control electrical power supply to the wide-angle camera set 10 so that no electrical power is supplied to the wide-angle camera 11 and the wide-angle camera 12 included in the wide-angle camera set 10 when the above-described first processing is performed. In addition, the processing unit 30 may control electrical power supply to the wide-angle camera set 10 so that electrical power is supplied to the wide-angle camera 11 and the wide-angle camera 12 included in the wide-angle camera set 10 when the above-described second processing is performed.

With this configuration, electric power consumption can be reduced.

5. Hardware Configuration

Figure 8:
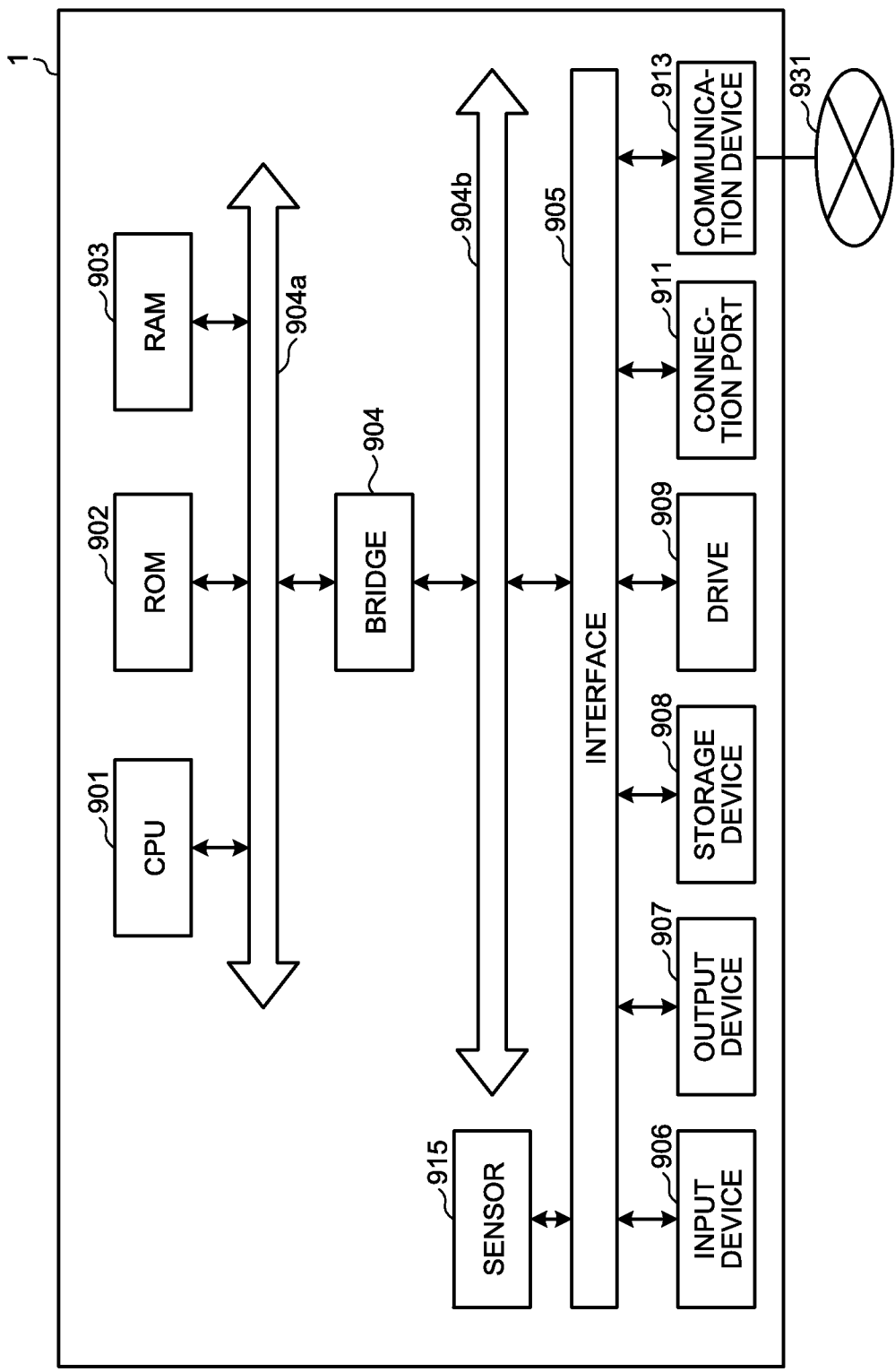
FIG. 8 is a block diagram illustrating an exemplary hardware configuration.

The embodiment of the present disclosure is described above. Lastly, the following describes a hardware configuration of the image capturing apparatus 1 according to the embodiment of the present disclosure with reference to FIG. 8. FIG. 8 is a block diagram illustrating an exemplary hardware configuration of the image capturing apparatus 1 according to the embodiment of the present disclosure. The information processing performed by the image capturing apparatus 1 according to the embodiment of the present disclosure is achieved through cooperation of software and hardware described below.

As illustrated in FIG. 8, the image capturing apparatus 1 includes a central processing unit (CPU) 901, a read only memory (ROM) 902, a random access memory (RAM) 903, and a host bus 904a. The image capturing apparatus 1 also includes a bridge 904, an external bus 904b, an interface 905, an input device 906, an output device 907, a storage device 908, a drive 909, a connection port 911, a communication device 913, and a sensor 915. The image capturing apparatus 1 may include a processing circuit such as a DSP or an ASIC in place of or in addition to the CPU 901.

The CPU 901 functions as an arithmetic processing device and a control device, and controls the entire operation in the image capturing apparatus 1 in accordance with various computer programs. The CPU 901 may be a microprocessor. The ROM 902 stores, for example, computer programs and calculation parameters used by the CPU 901. The RAM 903 temporarily stores, for example, computer programs used in execution by the CPU 901 and parameters that change as appropriate in the execution. The CPU 901 may form, for example, the processing unit 30.

The CPU 901, the ROM 902, and the RAM 903 are connected with each other through the host bus 904a including a CPU bus. The host bus 904a is connected with the external bus 904b such as a peripheral component interconnect/interface (PCI) bus through the bridge 904. The host bus 904a, the bridge 904, and the external bus 904b do not necessarily need to be separately configured, but the functions of these buses may be implemented by one bus.

The input device 906 is achieved by a device through which information is input by a user, such as a mouse, a keyboard, a touch panel, a button, a microphone, a switch, or a lever. Alternatively, the input device 906 may be a remote control device using, for example, infrared or other radio wave, or may be an external connection instrument, such as a cellular phone or a PDA compatible, with operation of the image capturing apparatus 1. In addition, the input device 906 may include, for example, an input control circuit configured to generate an input signal based on information input by the user through the above-described input unit and to output the input signal to the CPU 901. The user of the image capturing apparatus 1 can input various kinds of data and instruct a processing operation to the image capturing apparatus 1 by operating the input device 906.

The output device 907 is achieved by a device capable of visually or audibly notifying the user of acquired information. Examples of such devices include display devices such as a CRT display device, a liquid crystal display device, a plasma display device, an EL display device, and a lamp, sound output devices such as a speaker and a headphone, and printer devices. The output device 907 outputs, for example, results obtained through various kinds of processing performed by the image capturing apparatus 1. Specifically, each display device visually displays the results obtained through various kinds of processing performed by the image capturing apparatus 1 in various formats of text, image, table, graph, and the like. Each sound output device converts an audio signal made of regenerated voice data, acoustic data, or the like into an analog signal, and audibly outputs the analog signal.

The storage device 908 is a data storage device formed as an exemplary storage unit of the image capturing apparatus 1. The storage device 908 is achieved by, for example, a magnetic storage unit device such as a HDD, a semiconductor storage device, an optical storage device, or a magneto-optical storage device. The storage device 908 may include, for example, a storage medium, a record device configured to record data in the storage medium, a readout device configured to read data from the storage medium, and a deletion device configured to delete data recorded in the storage medium. The storage device 908 stores, for example, computer programs executed by the CPU 901, various kinds of data, and various kinds of data acquired from outside. The storage device 908 may form, for example, the storage unit 50.

The drive 909 is a storage medium reader-writer built in or externally connected with the image capturing apparatus 1. The drive 909 reads information recorded in a removable storage medium mounted thereon, such as a magnetic disk, an optical disk, a magneto-optical disc, or a semiconductor memory, and outputs the read information to the RAM 903. The drive 909 can write information to the removable storage medium.

The connection port 911 is an interface to be connected with an external instrument, and is a connection part for an external instrument with which data transmission is possible through, for example, a universal serial bus (USB).

The communication device 913 is, for example, a communication interface formed of a communication device or the like for connection with a network 920. The communication device 913 is, for example, a communication card for a wired or wireless local area network (LAN), long term evolution (LTE), Bluetooth (registered trademark), or wireless USB (WUSB). Alternatively, the communication device 913 may be, for example, an optical communication router, an asymmetric digital subscriber line (ADSL) router, or a communication modem of various kinds. The communication device 913 can communicate signals and the like with, for example, the Internet or another communication instrument according to a predetermined protocol such as TCP/IP.

The sensor 915 is various sensors such as a camera, a microphone, an acceleration sensor, a gyro sensor, a geomagnetic sensor, a light sensor, a distance measurement sensor, or a force sensor. The sensor 915 acquires information related to the state of the image capturing apparatus 1, such as the posture and moving speed of the image capturing apparatus 1, and information related to the environment around the image capturing apparatus 1, such as brightness and noise around the image capturing apparatus 1. The sensor 915 may include a GPS sensor configured to receive GPS signals and measure the latitude, longitude, and altitude of the apparatus. The sensor 915 may form, for example, the wide-angle camera set 10 and the narrow-angle camera set 20.

The network 920 is a wired or wireless transmission path for information transmitted from a device connected with the network 920. For example, the network 920 may include public networks such as the Internet, a phone network, and a satellite communication network, various local area networks (LAN) including Ethernet (registered trademark), and a wide area network (WAN). The network 920 may also include a dedicated network such as an internet protocol-virtual private network (IP-VPN).

The exemplary hardware configuration that achieves the functions of the image capturing apparatus 1 according to the embodiment of the present disclosure is described above. Each above-described component may be achieved by using a general-purpose member or may be achieved by hardware specialized for the function of the component. Thus, a hardware configuration to be used may be changed as appropriate in accordance with the technology level when the embodiment of the present disclosure is performed.

A computer program for achieving each function of the image capturing apparatus 1 according to the embodiment of the present disclosure as described above may be produced and implemented on a PC or the like. In addition, a computer-readable recording medium storing such a computer program may be provided. The recording medium is, for example, a magnetic disk, an optical disk, a magneto-optical disc, or a flash memory. The above-described computer program may be distributed through, for example, a network without using the recording medium.

6. Conclusion

As described above, according to the embodiment of the present disclosure, the accuracy of the self-position-posture estimation can be further improved.

The preferable embodiment of the present disclosure is described above in detail with reference to the accompanying drawings, but the technical scope of the present disclosure is not limited to such an example. Various changes and modifications could be thought of by any person having typical knowledge in the technical field of the present disclosure within the range of the technical idea recited in the claims, and it should be understood that these changes and modifications belong to the technical scope of the present disclosure.

Effects described in the present specification are merely explanatory or exemplary but not restrictive. Thus, the technology according to the present disclosure achieves, together with or in place of the above-described effects, any other effect that is clear to the skilled person in the art from description of the present specification.

Configurations as described below belong to the technical scope of the present disclosure.

(1)

An information processing device comprising:

a movement estimation unit configured to estimate position and posture movement by using corresponding-point information obtained based on image capturing; and a corresponding-point information selection unit configured to select the corresponding-point information to be used by the movement estimation unit from among a plurality of pieces of corresponding-point information, wherein the pieces of corresponding-point information include first corresponding-point information obtained based on image capturing by a first camera set including a first camera and a second camera, and second corresponding-point information obtained based on image capturing by a second camera set including a third camera and a fourth camera, the first camera set has a wider view angle than that of the second camera set, and the first camera set and the second camera set have image capturing ranges that are at least partially identical to each other.

(2)

The information processing device according to (1), wherein the corresponding-point information is obtained by matching between a feature point detected from an image of a current frame and a feature point detected from an image of a past frame.

(3)

The information processing device according to (2), wherein the first corresponding-point information is obtained by matching between a feature point detected from an image based on image capturing by the first camera or the second camera and the feature point detected from the image of the past frame, and the second corresponding-point information is obtained by matching between a feature point detected from an image based on image capturing by the third camera or the fourth camera and the feature point detected from the image of the past frame.

(4)

The information processing device according to (3), wherein the corresponding-point information selection unit selects, for each of the feature points, the corresponding-point information to be used by the movement estimation unit in accordance with whether the second corresponding-point information has been obtained.

(5)

The information processing device according to (4), wherein, when the second corresponding-point information has been obtained, the corresponding-point information selection unit selects the second corresponding-point information as the corresponding-point information to be used by the movement estimation unit.

(6)

The information processing device according to (3), wherein the movement estimation unit estimates the position and posture movement based on three-dimensional position information of the feature point in the past frame, which is included in the corresponding-point information, and two-dimensional position information of the feature point in the current frame.

(7)

The information processing device according to (6), further comprising:

a distance estimation unit configured to estimate a distance by using parallax information related to the feature point and acquire the three-dimensional position information related to the feature point; and a parallax information selection unit configured to select parallax information to be used by the distance estimation unit from among first parallax information obtained based on image capturing by the first camera set and second parallax information obtained based on image capturing by the second camera set.

(8)

The information processing device according to (7), wherein the first parallax information is obtained by matching between a feature point detected from an image based on image capturing by the first camera and a feature point detected from an image based on image capturing by the second camera, and the second parallax information is obtained by matching between a feature point detected from an image based on image capturing by the third camera and a feature point detected from an image based on image capturing by the fourth camera.

(9)

The information processing device according to (8), wherein the second parallax information is obtained by matching between a feature point at which the first parallax information is obtained among the feature point detected from the image based on image capturing by the third camera and the feature point detected from the image based on image capturing by the fourth camera.

(10)

The information processing device according to (9), wherein the parallax information selection unit selects, for each of the feature points, the parallax information to be used by the distance estimation unit in accordance with whether the second parallax information has been obtained.

(11)

The information processing device according to (10), wherein, when the second parallax information has been obtained, the parallax information selection unit selects the second parallax information as the parallax information to be used by the distance estimation unit.

(12)

The information processing device according to any one of (2) to (11), wherein the corresponding-point information selection unit selects the corresponding-point information to be used by the movement estimation unit in accordance with number of feature points for which the second corresponding-point information is obtained.

(13)

The information processing device according to any one of (2) to (12), wherein electrical power supply to the first camera set is controlled based on number of feature points for which the second corresponding-point information is obtained or movement information indicating the position and posture movement.

(14)

The information processing device according to any one of (2) to (13), wherein the distance between the first camera and the second camera is longer than the distance between the third camera and the fourth camera.

(15)

An information processing method comprising:

estimating position and posture movement by using corresponding-point information obtained based on image capturing; and selecting, by a processor, the corresponding-point information to be used to estimate the movement from among a plurality of pieces of corresponding-point information, wherein the pieces of corresponding-point information include first corresponding-point information obtained based on image capturing by a first camera set including a first camera and a second camera, and second corresponding-point information obtained based on image capturing by a second camera set including a third camera and a fourth camera, the first camera set has a wider view angle than that of the second camera set, and the first camera set and the second camera set have image capturing ranges that are at least partially identical to each other.

(16)

A computer-readable recording medium recording a computer program configured to cause a computer to achieve:

a function to estimate position and posture movement by using corresponding-point information obtained based on image capturing; and a function to select the corresponding-point information to be used to estimate the movement from among a plurality of pieces of corresponding-point information, wherein the pieces of corresponding-point information include first corresponding-point information obtained based on image capturing by a first camera set including a first camera and a second camera, and second corresponding-point information obtained based on image capturing by a second camera set including a third camera and a fourth camera, the first camera set has a wider view angle than that of the second camera set, and the first camera set and the second camera set have image capturing ranges that are at least partially identical to each other.

(17)

An image capturing apparatus comprising:

a first camera set including a first camera and a second camera;

a second camera set including a third camera and a fourth camera;

a movement estimation unit configured to estimate position and posture movement by using corresponding-point information obtained based on image capturing; and a corresponding-point information selection unit configured to select the corresponding-point information to be used by the movement estimation unit from among a plurality of pieces of corresponding-point information, wherein the pieces of corresponding-point information include first corresponding-point information obtained based on image capturing by a first camera set including a first camera and a second camera, and second corresponding-point information obtained based on image capturing by a second camera set including a third camera and a fourth camera, the first camera set has a wider view angle than that of the second camera set, and the first camera set and the second camera set have image capturing ranges that are at least partially identical to each other.

REFERENCE SIGNS LIST 1 image capturing apparatus
10 wide-angle camera set
11, 12 wide-angle camera
20 narrow-angle camera set
23, 24 narrow-angle camera
30 processing unit
31 feature detection unit
32 parallax matching unit
33 extraction unit
34 parallax information selection unit
35 distance estimation unit
36 matching unit
37 corresponding-point information selection unit
38 movement estimation unit
39 position-posture estimation unit
50 storage unit

The invention claimed is:

1. An information processing device, comprising:
a movement estimation unit configured to estimate position and posture movement of a first camera based on corresponding-point information; and
a corresponding-point information selection unit configured to select the corresponding-point information from a plurality of pieces of corresponding-point information for the estimation of the position and posture movement of the first camera, wherein
the plurality of pieces of corresponding-point information includes:
first corresponding-point information obtained based on a first image capturing operation by a first camera set including the first camera and a second camera, and
second corresponding-point information obtained based on a second image capturing operation by a second camera set including a third camera and a fourth camera,
the first camera set has a wider view angle than that of the second camera set, and
an image capturing range of the first camera set is at least partially identical to an image capturing range of the second camera set.

2. The information processing device according to claim 1, further comprising a motion matching unit configured to obtain the corresponding-point information by execution of a matching operation between a first feature point detected from an image of a current frame and a second feature point detected from an image of a past frame.

3. The information processing device according to claim 2, wherein the motion matching unit is further configured to:
obtain the first corresponding-point information by execution of a matching operation between a third feature point detected from an image captured by one of the first camera or the second camera and the second feature point detected from the image of the past frame; and
obtain the second corresponding-point information by execution of a matching operation between a fourth feature point detected from an image captured by one of the third camera or the fourth camera and the second feature point detected from the image of the past frame.

4. The information processing device according to claim 3, wherein the corresponding-point information selection unit is further configured to select, for each of the third feature point and the fourth feature point, the corresponding-point information based on whether the second corresponding-point information has been obtained.

5. The information processing device according to claim 4, wherein, in a case where the second corresponding-point information has been obtained, the corresponding-point information selection unit is further configured to select the second corresponding-point information as the corresponding-point information for the estimation of the position and posture movement.

6. The information processing device according to claim 3, wherein
the movement estimation unit is further configured to estimate the position and posture movement based on three-dimensional position information of the second feature point in the past frame and two-dimensional position information of the first feature point in the current frame, and
the corresponding-point information includes the three-dimensional position information of the second feature point in the past frame.

7. The information processing device according to claim 6, further comprising:
a distance estimation unit configured to:
estimate a distance to at least one of the third feature point or the fourth feature point based on parallax information related to the at least one of the third feature point or the fourth feature point; and
acquire the three-dimensional position information related to the at least one of the third feature point or the fourth feature point; and
a parallax information selection unit configured to select the parallax information for the estimation of the distance from among first parallax information obtained based on the first image capturing operation by the first camera set and second parallax information obtained based on the second image capturing operation by the second camera set.

8. The information processing device according to claim 7, further comprising a parallax matching unit configured to:
obtain the first parallax information by execution of a matching operation between a fifth feature point detected from a first image captured by the first camera and a sixth feature point detected from a second image captured by the second camera; and
obtain the second parallax information by execution of a matching operation between a seventh feature point detected from a third image captured by the third camera and an eighth feature point detected from a fourth image captured by the fourth camera.

9. The information processing device according to claim 8, wherein
the parallax matching unit is further configured to obtain the second parallax information by execution of a matching operation between a ninth feature point at which the first parallax information is obtained and the eighth feature point detected from the fourth image, and
the ninth feature point corresponds to the seventh feature point detected from the third image.

10. The information processing device according to claim 9, wherein the parallax information selection unit is further configured to select the parallax information based on whether the second parallax information has been obtained.

11. The information processing device according to claim 10, wherein, in a case where the second parallax information has been obtained, the parallax information selection unit is further configured to select the second parallax information as the parallax information for the estimation of the distance.

12. The information processing device according to claim 2, wherein the corresponding-point information selection unit is further configured to select the corresponding-point information based on a number of feature points for which the second corresponding-point information is obtained.

13. The information processing device according to claim 2, further comprising a processing unit configured to control an electrical power supply to the first camera set based on one of a number of feature points for which the second corresponding-point information is obtained or movement information indicating the position and posture movement.

14. The information processing device according to claim 1, wherein a distance between the first camera and the second camera is longer than a distance between the third camera and the fourth camera.

15. An information processing method, comprising:
estimating, by a processor, position and posture movement of a first camera based on corresponding-point information; and
selecting, by the processor, the corresponding-point information from a plurality of pieces of corresponding-point information for the estimation of the position and posture movement of the first camera, wherein the plurality of pieces of corresponding-point information includes:
- first corresponding-point information obtained based on a first image capturing operation by a first camera set including the first camera and a second camera, and
- second corresponding-point information obtained based on a second image capturing operation by a second camera set including a third camera and a fourth camera, the first camera set has a wider view angle than that of the second camera set, and an image capturing range of the first camera set is at least partially identical to an image capturing range of the second camera set.

16. A non-transitory computer-readable medium having stored thereon computer-executable instructions that, when executed by a processor, cause the processor to execute operations, the operations comprising:
- estimating position and posture movement of a first camera based on corresponding-point information; and
- selecting the corresponding-point information from a plurality of pieces of corresponding-point information for the estimation of the position and posture movement of the first camera, wherein
- the plurality of pieces of corresponding-point information includes:
  - first corresponding-point information obtained based on a first image capturing operation by a first camera set including the first camera and a second camera, and
  - second corresponding-point information obtained based on a second image capturing operation by a second camera set including a third camera and a fourth camera, the first camera set has a wider view angle than that of the second camera set, and an image capturing range of the first camera set is at least partially identical to an image capturing range of the second camera set.

17. An image capturing apparatus, comprising:
- a first camera set including a first camera and a second camera;
- a second camera set including a third camera and a fourth camera;
- a movement estimation unit configured to estimate position and posture movement of the first camera based on corresponding-point information; and
- a corresponding-point information selection unit configured to select the corresponding-point information from a plurality of pieces of corresponding-point information for the estimation of the position and posture movement of the first camera, wherein
- the plurality of pieces of corresponding-point information includes:
  - first corresponding-point information obtained based on a first image capturing operation by the first camera set including the first camera and the second camera, and
  - second corresponding-point information obtained based on a second image capturing operation by the second camera set including the third camera and the fourth camera, the first camera set has a wider view angle than that of the second camera set, and an image capturing range of the first camera set is at least partially identical to an image capturing range of the second camera set.

* * * * *